(12) United States Patent
Wilks et al.

(10) Patent No.: US 9,664,790 B2
(45) Date of Patent: May 30, 2017

(54) TIME OF FLIGHT CAMERA SYSTEM

(71) Applicant: IFM ELECTRONIC GMBH, Essen (DE)

(72) Inventors: Ralph Wilks, Meckenbeuren (DE); Christian Prestele, Friedrichshafen (DE)

(73) Assignee: pmdtechnologies ag (DE)

( * ) Notice: Subject to any disclaimer, the term of this patent is extended or adjusted under 35 U.S.C. 154(b) by 232 days.

(21) Appl. No.: 14/397,347

(22) PCT Filed: Apr. 26, 2013

(86) PCT No.: PCT/EP2013/058736
§ 371 (c)(1),
(2) Date: Oct. 27, 2014

(87) PCT Pub. No.: WO2013/174614
PCT Pub. Date: Nov. 28, 2013

(65) Prior Publication Data
US 2015/0124240 A1 May 7, 2015

(30) Foreign Application Priority Data

May 21, 2012 (DE) .......... 10 2012 208 409

(51) Int. Cl.
*G01C 3/08* (2006.01)
*G01S 17/08* (2006.01)
(Continued)

(52) U.S. Cl.
CPC .......... *G01S 17/08* (2013.01); *G01S 7/4915* (2013.01); *G01S 17/36* (2013.01); *G01S 17/89* (2013.01)

(58) Field of Classification Search
CPC .......... G01S 17/36; G01S 17/08; G01S 17/89; G01S 7/4915
(Continued)

(56) References Cited

U.S. PATENT DOCUMENTS 6,587,186 B2   7/2003   Bamji et al.
7,274,815 B1 *  9/2007   Smithpeter .......... G06K 9/2036
                                                    382/154
(Continued)

FOREIGN PATENT DOCUMENTS

DE          19704496 A1     3/1998

OTHER PUBLICATIONS

International Search Report; PCT/EP2013/058736; International Filing Date: Apr. 26, 2013; IFM Electronic GMBH; 2 pgs.

*Primary Examiner* — Mark Hellner
(74) *Attorney, Agent, or Firm* — Schmeiser, Olsen & Watts, LLP

(57) ABSTRACT

A light propagation time camera system and a method for operating such a system, in which—in a distance measurement a first range-related variable is ascertained using a phase shift in an emitted and received signal for a first modulation frequency,—and in a control measurement a second range-related variable is ascertained, wherein the control measurement is performed at a second modulation frequency, which differs from the first modulation frequency, and the control measurement is performed with a smaller number of phases than the distance measurement is provided.

9 Claims, 4 Drawing Sheets

(51) Int. Cl.
    *G01S 17/36*     (2006.01)
    *G01S 17/89*     (2006.01)
    *G01S 7/491*     (2006.01)
(58) Field of Classification Search
    USPC .................................................... 356/5.01
    See application file for complete search history.

(56) References Cited

U.S. PATENT DOCUMENTS

| | | |
|---|---|---|
| 2007/0102811 A1 | 5/2007 | Swaminathan et al. |
| 2010/0053592 A1 | 3/2010 | Yahav et al. |
| 2012/0013887 A1* | 1/2012 | Xu .......................... G01S 17/89 |
| | | 356/4.02 |
| 2012/0033045 A1* | 2/2012 | Schweizer ............ G01S 7/4912 |
| | | 348/46 |

* cited by examiner

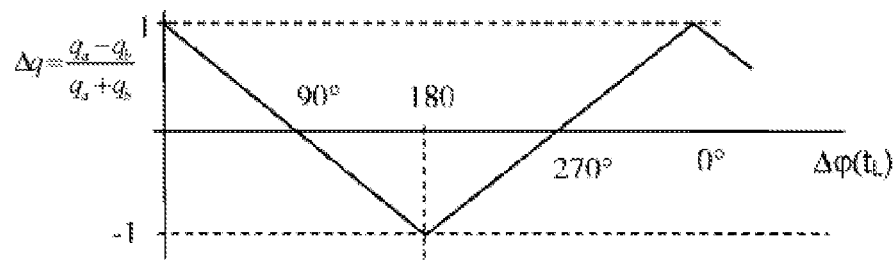
Fig. 3a
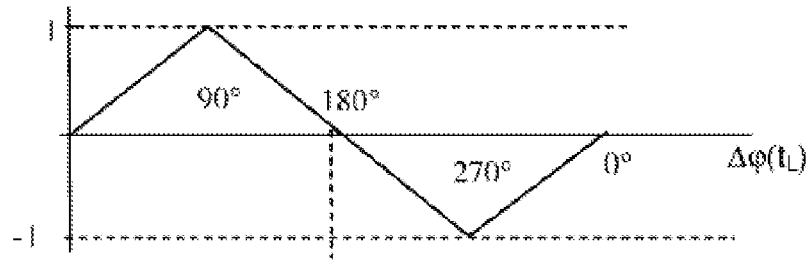
Fig. 3b
Fig. 3
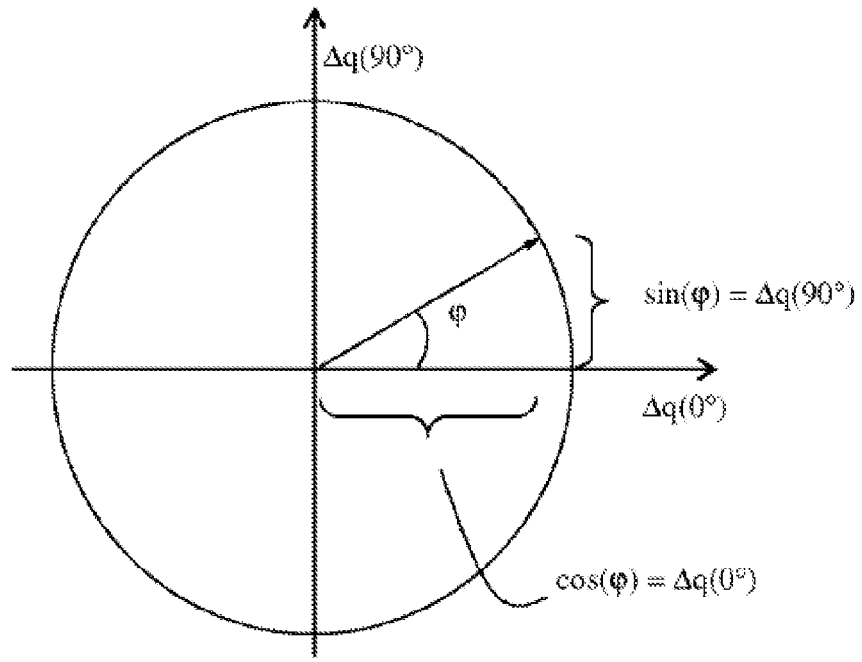
Fig. 4

TIME OF FLIGHT CAMERA SYSTEM

CROSS-REFERENCE TO RELATED APPLICATION

This application claims priority to PCT Application No. PCT/EP2013/058736, having a filing date of Apr. 26, 2013, based on DE 10 2012 208 409.6 filed May 21, 2012, the entire contents of which are hereby incorporated by reference.

FIELD OF TECHNOLOGY

The following relates to a time of flight (TOF) camera system and a method for operating such a system.

BACKGROUND

TOF camera systems should not only comprise systems that ascertain the distances directly from the time of flight, but, in particular, also all the TOF camera systems, or 3D-TOF camera systems, which capture runtime information from the phase shift of an emitted and received radiation. PMD cameras with photonic mixer detectors (PMD) are especially suitable as TOF cameras or 3D-TOF cameras, as described in the applications EP 1 777 746, U.S. Pat. No. 6,587,186 and also DE 197 04 496, among others, and available, for example, from "ifm electronic GmbH" or "PMD Technologies GmbH" as the Frame Grabber 03D or as CamCubes. The PMD camera allows, in particular, a flexible arrangement of the light source and of the detector, which can be arranged in a housing as well as separately. Of course, cameras or devices with at least one receiving pixel should also be included in the term camera, or camera systems, like the applicant's distance measuring device O1D.

As described in detail in DE 197 04 496, in order to ascertain a distance or a corresponding phase shift of the reflected light the PMD sensor mixes the reflected light with the modulated signal. This mixture emits an in-phase signal (0°) and a signal shifted by 180°, from which a distance can be ascertained in a known manner. To improve the quality of the distance measurement the transmission modulation can be specifically shifted by 90°, 180° or 270° and preferentially ascertains a phase angle of the reflected signal relative to the transmitted signal by means of an IQ (in-phase, quaternary) demodulation. This procedure, in particular, is useful to capture redundant data in order to compensate, for example, different parasitic effects, such as fixed pattern noise (FPN), background light or asymmetries of the sensor.

SUMMARY

A method for operating a TOF camera system is advantageously provided, in which, in the case of a distance measurement, a first range-related variable is ascertained for a first modulation frequency on the basis of the phase shift of an emitted and received signal, and a second range-related variable is calculated in a control measurement, the control measurement being carried out at a second modulation frequency, which differs from the first modulation frequency, and the control measurement being carried out with a smaller number of phase positions than the distance measurement.

As a result of the preferentially shorter and/or simpler control measurement, the distance values ascertained in the distance measurement can be quickly and reliably verified.

For verification purposes, embodiments of the invention advantageously provides that the distance measurement is only recognized as being valid, if the difference in magnitude between the first and second range-related variable is below a tolerated threshold value.

Measurement errors due to over-the-horizon propagation or interferences can be prevented in this way, for example.

Both range-related variables are preferably a first and a second distance value.

It can likewise be provided that the first range-related variable ascertained in the distance measurement corresponds to an expected range-related variable in the control measurement, or can be converted thereto.

It is thus possible, for example, to determine an expected electrical variable for a specific phase position from the variable ascertained in the distance measurement and to compare this expected variable to the captured variable.

The control measurement is preferably carried out with a simplified distance measurement, in which only one or two phase shifts are taken into account for measuring the distance.

The duration of the control measurement is preferentially shorter than that of the distance measurement.

The control measurement is advantageously carried out preferentially immediately prior to and/or after the measurement of the distance to the object.

It is especially advantageous to carry out the distance measurement and the control measurements at different modulation frequencies so that the measurements can be carried out with diverse measuring methods.

A TOF camera system is likewise advantageously provided with a modulator, which is connected to an illumination and a receiver of the TOF camera system, a modulation control device being connected to the modulator and configured in such a manner that the modulator can be operated with at least two modulation frequencies, an evaluation unit being configured in such a manner that a first range-related variable is ascertained in a distance measurement on the basis of a phase shift of a first emitted and received signal for a first modulation frequency, and a second range-related variable is ascertained in a control measurement, the control measurement being carried out at a second modulation frequency, which differs from the first modulation frequency, and the control measurement being carried out with a smaller number of phase positions than the distance measurement.

BRIEF DESCRIPTION OF THE DRAWINGS

Some of the embodiments will be described in detail, with reference to the following figures, wherein like designations denote like members, wherein:

FIG. 3 two timing profiles of the charge integration with different phase positions;

FIG. 4 relation of the integration in an IQ diagram;

DETAILED DESCRIPTION

Figure 1:
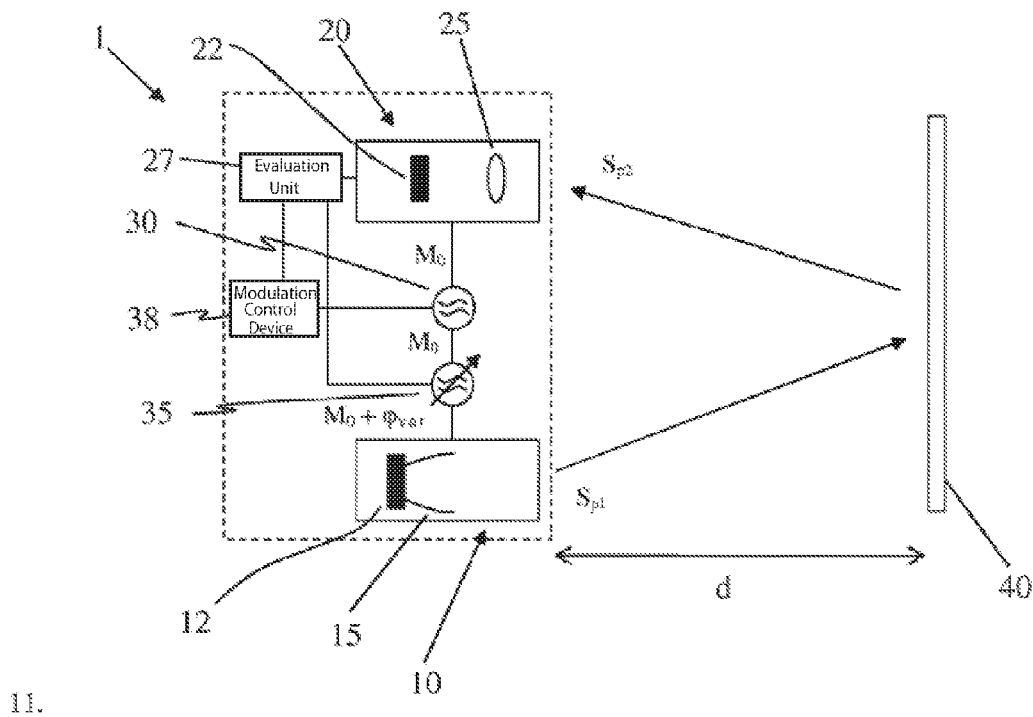
FIG. 1 a schematic diagram of the fundamental principle of photomixing detection.

In the following description of the preferred embodiments like reference numerals refer to like or comparable components.

FIG. 1 shows a measuring situation for an optical distance measurement with a TOF camera, as it is known, for example, from DE 197 04 496.

The TOF camera system 1 comprises a transmitting unit or an illumination module 10, including illumination 12 and associated beam forming optics 15 as well as a receiving unit or TOF camera 20 with a receiving optics 25 and a TOF photo sensor 22. The TOF photo sensor 22 has at least one time of flight pixel, preferentially a pixel array, and is in particular configured as a PMD sensor. The receiving optical system 25 typically consists of a plurality of optical elements to improve the imaging properties. The beam forming optical system 15 of the transmission unit 10 can be configured, for example, as a reflector or as an optical lens. In a very simple embodiment, all optical elements may be dispensed with on the receiving as well as on the transmitting side.

The measurement principle of this arrangement is essentially based on determining the propagation time and thus the distance covered by the received light, based on the phase shift of the emitted and received light. For this purpose, the light source 12 and the TOF photo sensor 22 are jointly supplied with a defined modulation frequency $M_0$ with a basic phase position $\phi_0$. In the shown example, a phase shifter 35 is furthermore provided between the modulator 30 and the light source 12, with which the basic phase $\phi_0$ of the modulation signal $M_0$ of the source 12 can be shifted by defined phase positions $\phi_{var}$. The phase positions of $\phi_{var}=0°, 90°, 180°, 270°$ are preferentially used for typical phase measurements.

Depending on the set modulation signal, the light source 12 emits an intensity modulated signal $S_{p1}$ with the first phase position p1 or p1=$\phi_0+\phi_{var}$. In the illustrated case, this signal or the electromagnetic radiation is reflected by an object 40 and, owing to the covered distance, arrives as a receiving signal $S_{p2}$ on the TOF photo sensor 22, correspondingly phase-shifted $\Delta\phi(t_L)$ with a second phase position p2=$(\phi_0+\phi_{var}+\Delta\phi(t_L))$. The modulation signal $M_0$ is mixed with the received signal $S_{p2}$ in the TOF photo sensor 22, the distance of the object being ascertained from the resulting signal of the phase shift or the distance d of the object.

To improve the accuracy of the measurements and/or to increase the dis-ambiguity range the embodiments of the invention further provides for implementation of time of flight measurements at different modulation frequencies. For this purpose, the modulator 30 is connected to a modulation control device 38, which preferentially can ascertain modulation frequencies within a predefined frequency spectrum.

The modulator 30, for example, may be configured as a frequency synthesizer, which is controlled via the modulation control device 38 for the respective measurement task.

Furthermore, the receiving unit 20 is connected to an evaluation unit 27. The evaluation unit 27 can optionally also be a component of the receiving unit 20 and, in particular, also part of the TOF photo sensor 22. The task of the evaluation unit 27 is to determine and/or evaluate phase shifts on the basis of the received signal relative to the modulation frequency. The received light beams are preferentially mixed with the modulation frequency in the TOF photo sensor 22 or in the PMD sensor. The modulation control device 38 can also be a component of the evaluation unit 27. In particular, it can also be provided that the evaluation unit 27 completely or in part takes over the function of the modulation control unit 38.

Infrared light diodes are preferentially suited as an illumination or light source 12. Other radiation sources in other frequency ranges are conceivable of course; in particular, light sources in the visible frequency range come into consideration.

Figure 2:
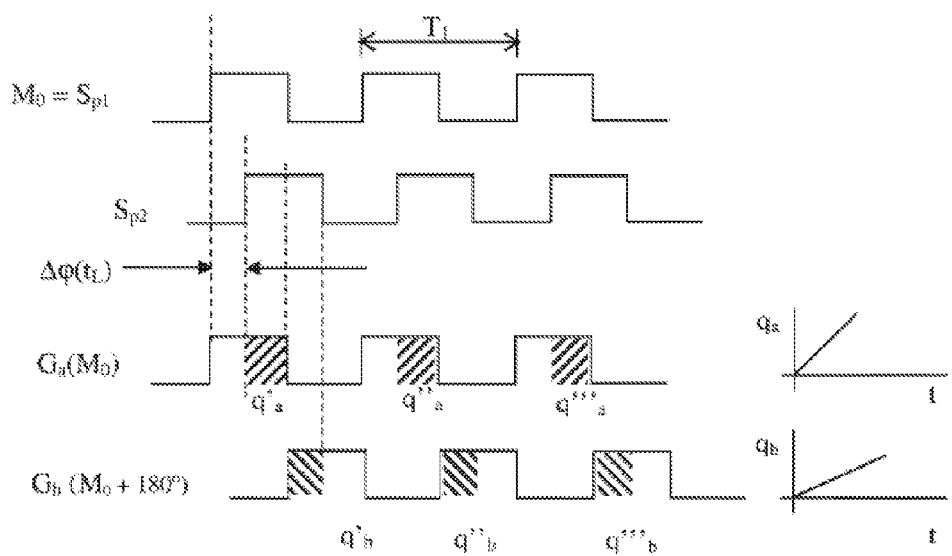
FIG. 2 a modulated integration of the generated charge carriers.

The fundamental principle of the phase measurement is schematically shown in FIG. 2. The upper curve shows the time profile of the modulation signal $M_0$ with which the illumination 12 and the TOF photo sensor 22 are controlled. The light reflected by the object 40 arrives phase-shifted $\Delta\phi(t_L)$ as a function of its life propagation time $t_L$, on the TOF photo sensor 22 as a receiving signal $S_{p2}$. The TOF photo sensor 22 collects the photonic charges q generated over several modulation periods at the phase position of the modulation signal $M_0$ in a first accumulation gate Ga, and in a phase position shifted by 180°, $M_0+180°$ in a second accumulation gate Gb. The phase shift $\Delta\phi(t_L)$ and thus the distance d to the object, can be ascertained from the ratio of the charges collected in the first and second gates Ga, Gb.

FIGS. 3a and 3b show profiles of the charge difference $\Delta q=q_a-q_b/(q_a+q_b)$ as a function of the phase shift $\Delta\phi(t_L)$ of the received light signal $S_{p2}$ with different phase positions. FIG. 3a shows a profile of a non-shifted modulation phase $M_0$ with a phase position $\phi_{var}=0°$.

When a signal $S_{p2}$ arrives without phase shift, that is $\Delta\phi(t_L)=0°$, for example, when the transmitting signal $S_{p1}$ is directed onto the sensor directly, then the phases of the modulation $M_0$ and of the received signal $S_{p2}$ are identical, so that all generated charge carriers are captured phase synchronously at the first gate Ga and thus a maximum difference signal of $\Delta q=1$ is present.

With an increasing phase shift, the charge decreases at the first accumulation gate Ga and increases at the second accumulation gate Gb. In the case of a phase shift of $\Delta\phi(t_L)=90°$, the charge carriers qa, qb are equally distributed at both gates Ga, Gb, and the difference is thus zero and after a 180° phase shift "−1". With a further increasing phase shift, the charge at the first gate Ga again increases, so that, as a result, the charge difference again increases and then reaches a maximum at 360° or 0°.

Mathematically, this is a correlation function of the received signal $S_{p2}$ with the modulating signal $M_0$.

$$q(\tau) = \int_0^T S_{p2}(t-\tau)M_0(t)\,dt$$

In the case of a modulation with a square wave signal, a triangle function results as a correlation function, as has already been shown. In the case of a modulation with, for example, a sinusoidal function, the result would be a cosine function.

As shown in FIG. 3a, a phase measurement at one phase position is only unambiguous up to one phase shift $\Delta\phi(t_L) \leq 180°$.

For a maximum capture of the phase shift, the IQ (in-phase quadrature) method is known, for example. It can be used to conduct two measurements with 90° shifted phase positions, for example, at the phase positions $\phi_{var}=0°$ and $\phi_{var}=90°$. The result of a measurement at the phase position $\phi_{var}=90°$ is shown in FIG. 3b.

The correlation of both these curves can be shown, for example, in a known manner for sinusoidal curve profiles in an IQ diagram, as is apparent in FIG. 4. In a first approximation, this representation can also easily be applied to the shown triangle functions.

The phase angle can then be ascertained via an arctan, in particular arctan 2 function in a known manner:

$$\varphi = \arctan\frac{\Delta q(90°)}{\Delta q(0°)}$$

For example, in order to compensate an asymmetry of the sensor, additional phase measurements shifted by 180° can be carried out, so that, as a result, the phase angle can be ascertained as follows:

$$\varphi = \arctan\frac{\Delta q(90°) - \Delta q(270°)}{\Delta(0°) - \Delta q(180°)}$$

Figure 5:
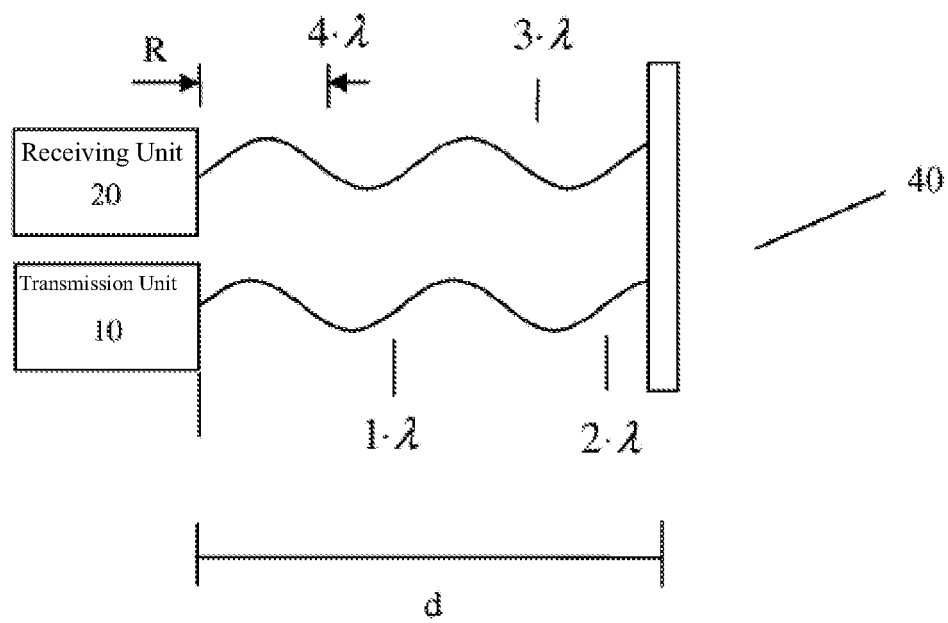
FIG. 5 a distance measurement with a distance to the object that is larger than half the wavelength.

FIG. 5 shows an example in which the object 40 has a distance d from the transmitter 10 of $d=2\lambda+R/2$, the distance covered up to the receiver 20 being, of course, twice as large, namely $D=2d=4\lambda+R$.

In such a case, and in general for distances d which are larger than half the wavelength $\lambda$ of the modulation frequency $d>\lambda/2$, no unambiguous distances can be ascertained solely from the determination of a single relative phase shift $\Delta\phi(t_L)$.

Figure 6:
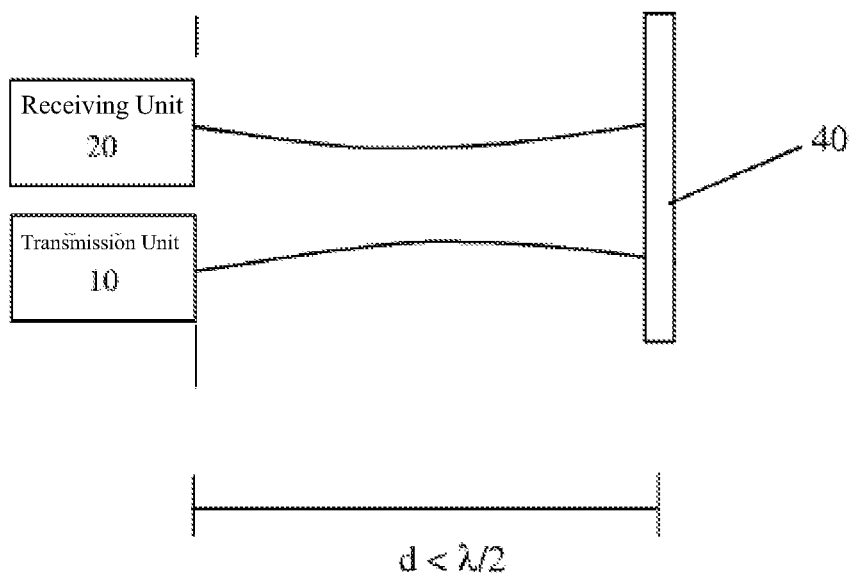
FIG. 6 a distance measurement with a distance to the object that is smaller than half the wavelength.

FIG. 6 shows an example which ensures that the distances of the objects 40 are always smaller than half the wavelength $\lambda/2$ of the applied modulation frequencies. In such a situation an object distance d can be ascertained in a known manner on the basis of a time propagation-induced relative phase shift $\Delta\phi(t_L)$.

$$d = \Delta\varphi(t_L) \cdot \frac{\lambda}{2\pi} \cdot \frac{1}{2} = \frac{b}{2} \cdot \lambda \text{ with } 0 \le b \le 1$$

According to the present embodiments of the invention, it is provided that the object distance is ascertained with at least one further modulation frequency, an object distance only being considered valid if at least one immediately previously or subsequently captured object distance has the same distance value within a tolerated deviation.

The distance values which are ascertained to verify a first distance value should preferably be ascertained with another method.

Figure 7:
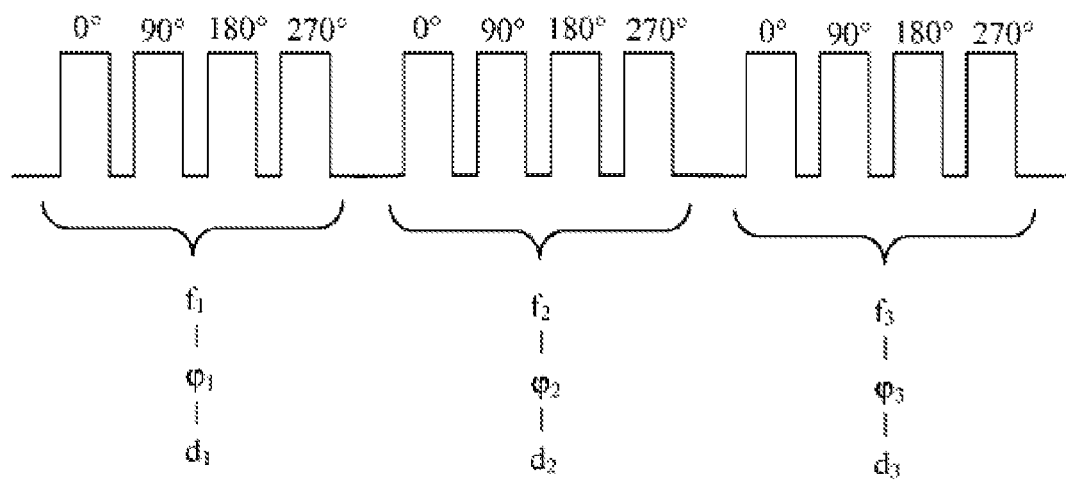
FIG. 7 a timing profile of the distance measurements at different modulation frequencies.

FIG. 7 shows a time sequence of the distance measurements at three different modulation frequencies $f_1$, $f_2$, $f_3$, the phase shift being ascertained on the basis of four different phase positions for each modulation frequency. If the ascertained distance values are similar for all modulation frequencies, then the ascertained distance values, or one of the ascertained distance values, are considered valid.

Figure 8:
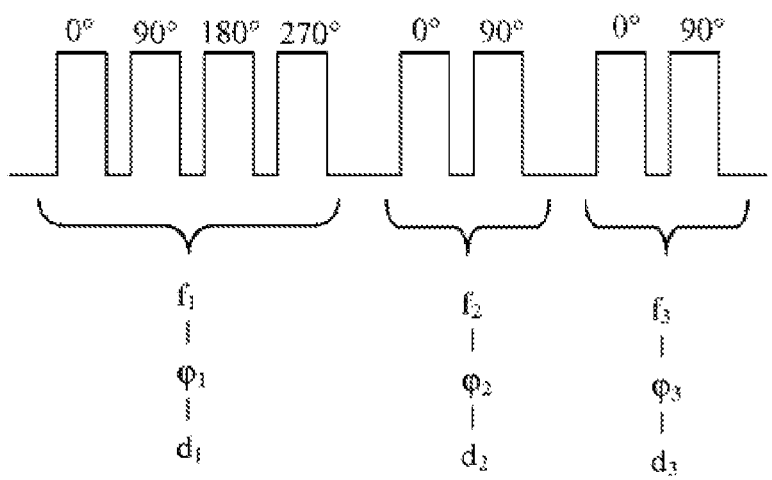
FIG. 8 a schematic diagram of a verification of the distance measurement.

FIG. 8 shows another method according to the embodiments of the invention, in which the phase shift is ascertained with a complete set of phase positions, namely at 0°, 90°, 180° and 270° for only one modulation frequency. The distance measurements at the other modulation frequencies are only carried out for control purposes and can be simplified. In the case shown here, only 0° and 90° are used as phase positions for the second and third modulation frequency $f_2$, $f_3$. Owing to the small number of phase positions, the distance value ascertained in a simplified manner can have larger tolerances than a distance value ascertained with a complete set of phase positions.

The deviations of the distance values to be tolerated should thus be selected larger than in the case shown in FIG. 7. The simplified control measurement is essentially used to verify whether the distance value ascertained with the complete set of phase positions is plausible. In this respect, the simplified control measurement need only provide distance values which are within the order of magnitude of the distance values to be expected.

Depending of the task and/or object distances, the control measurement can also be reduced to a distance measurement with a single phase position.

In another advantageous embodiment, the embodiments allow making assumptions about the control measurement and/or the calculation of expected range-related variables, in particular electrical variables.

An expected voltage difference at the integration node of the TOF camera system could preferentially be predetermined or calculated on the basis of the distance ascertained in the distance measurement cycle. In this respect, an explicit calculation of the distance value is not strictly necessary, but it will suffice for control purposes to compare the predetermined range-related values or variables to the actual value ascertained in the control measurement.

For example, a charge or voltage to be expected for the 90° phase position could be predetermined at one time of flight pixel. If the actual control value corresponds to the calculated value within tolerated deviations, the distance measurement is considered valid.

The control measurement can also be easily carried out prior to the distance measurement.

Modulation frequencies which have a larger wavelength than those used in the distance measurement are preferably used in the control measurement.

REFERENCE NUMERALS

10 Illumination Module
12 Illumination
22 TOF Photo Sensor
27 Evaluation Unit
30 Modulator
35 Phase Shifter, Illumination Phase Shifter
38 Modulation Control Device
$\Delta\phi(t_L)$ Propagation Time-Induced Phase Shift
$\phi_{var}$ Phase Position
$\phi_0$ Basic Phase
$M_0$ Modulation Signal
p1 First Phase
p2 Second Phase
Sp1 Transmission Signal with First Phase
Sp2 Receiving Signal with Second Phase
Ga, Gb Accumulation Gates
Ua, Ub Voltages at the Modulation Gate

The invention claimed is:

1. A method for operating a time of flight (TOF) camera system which can be operated with at least two modulation frequencies, wherein:
in a first distance measurement, a first range-related variable is ascertained on the basis of a phase shift of an emitted and received signal for a first modulation frequency, and in a second control measurement a range-related variable is ascertained, the control measurement being carried out at a second modulation frequency which differs from the first modulation frequency, and the control measurement is carried out with a smaller number of phase positions than the distance measurement;

wherein the distance measurement is only recognized as being valid if the difference in magnitude between the first and second range-related variable is below a tolerated threshold value.

2. A method according to claim 1, wherein both range-related variables are a first and a second distance value.

3. A method according to claim 1, wherein the first range-related variable ascertained in the distance measurement corresponds to an expected range-related variable in the control measurement or is converted thereto.

4. A method according to claim 1, wherein the control measurement is only carried out at one or two phase positions.

5. A method according to claim 1, wherein the duration of the control measurement is shorter than that of the distance measurement.

6. A method according to claim 1, in which the control measurement is carried out immediately prior to and/or after the distance measurement.

7. A method according to claim 1, wherein the successive distance measurements are carried out at different modulation frequencies.

8. A time of flight (TOF) camera system with a modulator which is connected to an illuminator and a receiver of the TOF camera system, wherein a modulation control device is connected to the modulator and configured in such a manner that the modulator can be operated with at least two modulation frequencies, and that an evaluation unit is configured in such a manner that in a first distance measurement, a first range-related variable is ascertained on the basis of a phase shift of an emitted and received signal for a first modulation frequency, and in a second control measurement a range-related variable is ascertained, the control measurement being carried out at a second modulation frequency which differs from the first modulation frequency, and the control measurement is carried out with a smaller number of phase positions than the distance measurement;

wherein the distance measurement is only recognized as being valid if the difference in magnitude between the first and second range-related variable is below a tolerated threshold value.

9. The TOF camera system according to claim 8, wherein the evaluation unit is configured for carrying out a method according to claim 1.

* * * * *